July 23, 1957 W. H. CALAHAN 2,800,282
DUAL BURNER FORCED AIR FURNACE AND CONTROL SYSTEM THEREFOR
Filed Sept. 4, 1953 2 Sheets-Sheet 1

INVENTOR.
William H. Calahan
BY
Wood, Herron & Evans
Attorneys.

United States Patent Office 2,800,282
Patented July 23, 1957

2,800,282

DUAL BURNER FORCED AIR FURNACE AND CONTROL SYSTEM THEREFOR

William H. Calahan, Fort Thomas, Ky., assignor to The Williamson Company, a corporation of Ohio Application September 4, 1953, Serial No. 378,520

1 Claim. (Cl. 236—9)

This invention relates to heating apparatus, and is particularly directed to a dual burner furnace and a control system for operating the furnace and its associated blower to automatically maintain the air within a room or other space at a predetermined temperature.

In the past, many different types of heating systems have been proposed embodying automatic control elements for actuating heating apparatus whenever the temperature within a room falls below a desired level. However each of these systems has been subject to one or more shortcomings which has prevented it from being completely satisfactory in use. One of the most common difficulties which has been encountered in previously proposed heating systems, is that there is a tendency for the temperature to overshoot the desired level, so that wide temperature fluctuations occur with appreciable discomfort to the occupants of the room.

Another difficulty which is prevalent with these systems is that they are ineffective to maintain a substantially uniform temperature throughout the entire area being heated, but rather cause some areas to become overheated, while others are underheated. As a result, it has often been found that in order to properly heat one portion of a room, other portions must be maintained either at an uncomfortably warm temperature, or else allowed to remain at an uncomfortably cold temperature. This latter difficulty is particularly noticeable in moderate weather.

The principal object of this invention is to provide a heating system which is effective to maintain an extremely even temperature throughout all parts of a room despite fluctuations in outside temperature. The present invention is predicated upon the concept of providing a heating system in which both the number of burners in operation, and the volume of air being circulated, are varied in accordance with the heat requirements of the room; so that the room is supplied with heat at a rate not excessively greater than the rate at which heat is being dissipated, and furthermore warm air is always introduced into the room at substantially the same temperature.

More specifically, a heating system constructed in accordance with the present invention comprises a furnace having two independently operated burners and a blower operable at either of two speeds for forcing air through the plenum chamber of the furnace and into the rooms of a house. In the preferred embodiment the two furnace burners are of substantially the same capacity, and are concentrically arranged one within another. The supply of gas to each of the burners is controlled by a separate electrically responsive valve.

Operation of the blower and gas valves is governed by means of a control circuit including two thermostats, an outdoor thermostat and a room thermostat. The room thermostat is adapted to close when the temperature in the room drops below a comfortable level, for example, 72° F.; while the outdoor thermostat is set to close at a predetermined outdoor temperature, for example, 20° F. The outdoor thermostat conditions the control circuit so that in warm weather only one burner is operated in response to the closing of the room thermostat, while in cold weather both burners are operated when the indoor thermostat is actuated. Similarly, the outdoor thermostat conditions the blower energization circuit so that the blower is operated at low speed in mild weather, and high speed in colder weather.

One of the principal advantages of the present heating system is that the required heat is supplied to the room at a rate only slightly greater than the rate at which heat is lost. Consequently, the temperature within the room is free from any wide fluctuations due to the "overshoot" inherent in a system supplying heat at a rate greatly in excess of the rate at which it is being dissipated. The even temperature thus obtained not only adds to the comfort of the occupants of the room but also helps to minimize the fuel consumed by the furnace.

An additional advantage of this system is that even in moderate weather, a uniform temperature is maintained in all portions of the space being heated. The difficulty with previous heating systems in this regard is that in moderate weather they force a large volume of heated air into the room and as a result the room thermostat, which is normally placed on an inside wall is heated and cuts off additional heat before the air has circulated sufficiently to warm the entire room.

In contrast, the present invention contemplates the introduction of a small volume of air in moderate weather so that the air will have time to thoroughly diffuse throughout the room, heating all portions at the same rate at which the thermostat is heated, and therefore by the time that the thermostat temperature rises sufficiently to cut off the gas flow, the entire room will have been heated to the desired temperature.

Another advantage of the present invention is that whether the outside temperature is moderate or extremely cold, the temperature gradient between the warm air introduced into the room and the air already in the room remains substantially the same. That is, while the air supplied during extremely cold weather may be slightly warmer than the air supplied during moderate weather, the two are of substantially the same temperature, not varying by more than fifteen or twenty degrees.

A still further advantage of the present invention is that the control system comprises a minimum number of control elements and hence is both economical to install and is extremely reliable in operation.

It is another object of the present invention to provide a dual burner unit for use in a heating system which can readily be altered to provide optimum performance in any installation. More particularly, the burner unit of this invention comprises two concentric rings, the inner ring being mounted directly on the outer ring by means of interlocking bolt lugs. Threaded connections are provided on the bottom of each of the burners for coupling the burners to suitable gas pipes. As a result of this arrangement, various types of burners can be combined to provide the most efficient operation of each installation, and a single damaged burner can be replaced without disturbing the other burner of an installation.

Another advantage of the dual burner arrangement of the present invention is that the rate at which gas is burned can be modulated without affecting the efficiency of the burner operation. As explained above, when a low volume of gas is required, only a single burner is operated; while when a high volume of gas is needed both burners are operated. However, no matter whether one or both burners are in operation gas is always supplied to the burners at the correct pressure for securing optimum burner efficiency. This gas pressure is never changed in the on-off burner control arrangement of the present invention.

These and other advantages of my invention will be apparent from a further consideration of the following detailed description of the drawings illustrating a preferred embodiment of the invention.

Figure 1:
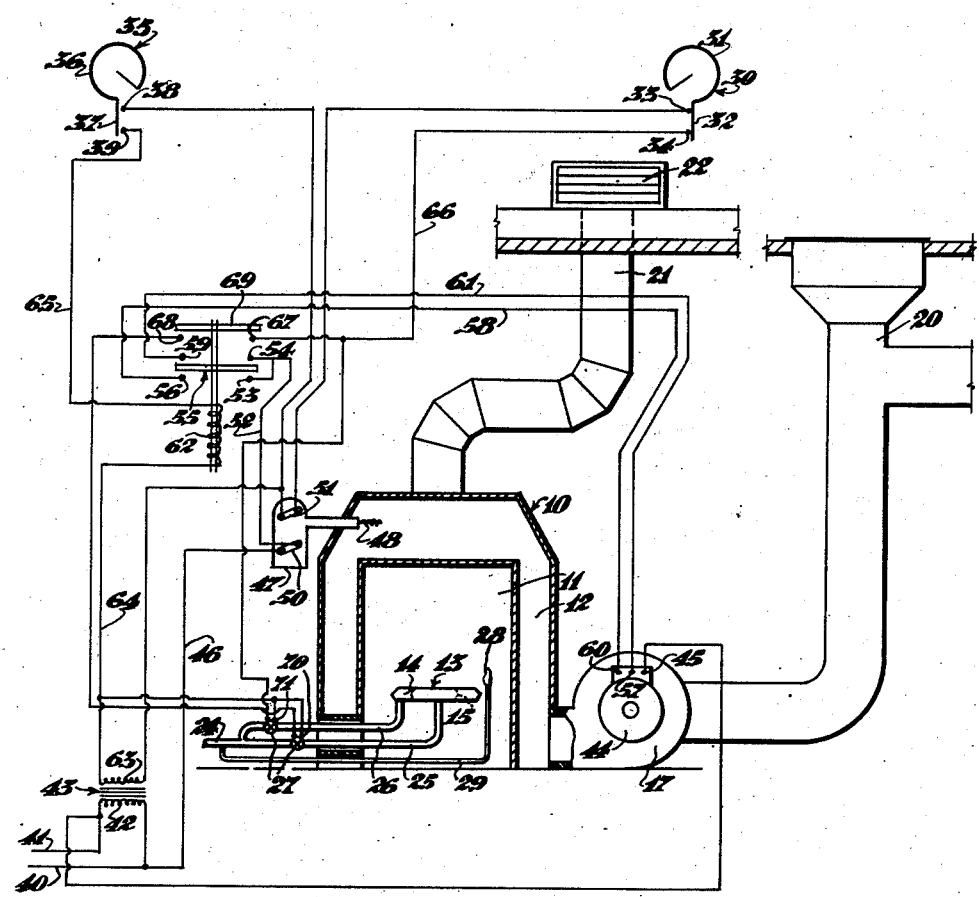
Figure 1 is a diagrammatic view showing a heating system including a forced air furnace and its associated control apparatus.

As shown in Figure 1, a heating system constructed in accordance with this invention includes a furnace 10, having a combustion chamber 11 surrounded by a warm air duct, or bonnet 12.

The combustion chamber houses a dual burner unit 13 comprising burners 14 and 15 which are described in detail below. It will suffice here to state that the burners are preferably in the form of concentric rings and can be operated independently of one another. Burner 14 is operated every time heat is required, while burner 15 is operated only when heat is required during periods of cold weather. The relative size of the burners is not critical, although in the preferred embodiment they are of substantially the same capacity. Since burner 14 is operated alone when a low rate of gas consumption is desired, this burner will hereafter be termed the "low" burner; while burner 15 which is operated in conjunction with burner 14 to provide a high combustion rate will be termed the "high" burner. Warm air is forced through the bonnet 12 by means of a blower 17 which draws air from the cold air return duct 20, and discharges it into the bonnet. After the air has been heated in the bonnet, it is forced by the blower pressure through suitable warm air ducts 21 to registers 22 disposed within the various rooms of a building.

Gaseous fuel is supplied to the burners through a suitable pipe 24 which is connected to a gas main, or other source of fuel supply, and includes branch lines 25 and 26 respectively connected to the high and low burners 14 and 15. It is also contemplated that the low burner can be connected to a gas main, while the high burner is supplied from a tank of liquified gas. This type of installation is particularly advantageous in those areas where local regulations require an auxiliary fuel source for use in severe weather. A control valve 27 is placed in each of the fuel supply lines. These valves are electrically activated; and, for example, may be of the solenoid type, including a plunger moveable in response to the energization of an electric coil, or they may be of the electrically controlled diaphragm type.

The burners are ignited by means of a constantly burning pilot light 28 which is supplied gas through tube 29. As will be readily understood by those skilled in the art, the pilot light preferably has a pilotstat, or thermal safety switch element, associated therewith; the switch element being effective to prevent energization and opening of the main gas valves if the pilot flame should become extinguished. Since the pilotstat switch constitutes no part of the present invention, it has been omitted from Figure 1.

The control system for the furnace includes a room thermostat 30 disposed within the space to be heated. The room thermostate can be of any suitable type; comprising for example, a bimetallic strip 31 upon a contact arm 32 is mounted, the contact arm being adapted for engagement with stationary contacts 33 and 34 whenever the temperature within the room drops below a predetermined value, for example 72°.

A second thermostat 35 is provided; this thermostat is placed out-of-doors, generally one one of the walls of the building, and preferably includes a bimetallic strip 36 carrying contact arm 37 which is adapted to engage fixed contacts 38 and 39 when the outdoor temperature drops below a predetermined amount, for example 20°.

Voltage for the control system is provided by main power lines 40 and 41 which are connected to the primary winding 42 of step-down transformer 43. These lines also energize fan motor 44 which is a two-speed motor having three input terminals. Line 41 is connected directly to one terminal 45 of the motor, while power line 40 is connected through lead 46 to one terminal of fan switch 47. Fan switch 47 is a thermostatic switch disposed in the plenum chamber of the furnace, and arranged to close as soon as the air in that chamber reaches a predetermined minimum temperature. One suitable construction for switch 47, as shown diagrammatically in Figure 1, includes a helical thermostatic strip 48 which actuates a mercury bulb 50 to close the circuit. It will be noted that the helical strip 48 also actuates a second mercury bulb 51. As will be explained later, this bulb forms a limit switch which opens to shut off the gas burners whenever the plenum temperature exceeds a maximum amount.

The fan switch is connected through lead 52 to contacts 53 and 54 of relay 55. This relay is a two-pole two-throw relay which in one position connects contact 53 with contact 56; contact 56 is in turn joined to the low speed terminal 57 of the motor by conductor 58. In its other position, relay 55 connects contact 54 with contact 59, which is in turn joined to the high speed terminal 60 by means of lead 61. The position of the relay armature is governed by the energization of relay coil 62 which is connected across the secondary winding 63 of transformer 43 through leads 64 and 65 and outdoor thermostat 35. As will be explained below, relay coil 62 is de-energized except when the temperature drops below the value to which the outdoor thermostat closes.

The burner control circuit is also powered by secondary winding 63 of transformer 43, and includes limit switch 51 which is normally closed and opens only if the plenum chamber becomes overheated. One end of secondary winding 63 is connected to the series combination of normally closed limit switch 51 and room thermostat 30. The room thermostat is in turn connected directly to one terminal of the low burner valve and is also connected to one terminal of the high burner valve through lead 66 and contacts 67 and 68 bridged by armature 64. Armature 69 is mechanically interconnected with armature 55 for operation by relay coil 62 in response to the closing of the outdoor thermostat. The other end of secondary 63 is joined directly to a second terminal 70 of the low burner valve and to terminal 71 of the high burner valve.

The control system functions so that when the outdoor temperature is above a predetermined amount, for example 20°, the room thermostat controls the energization of the low burner and the low speed fan coils. However, when the outdoor temperature falls below the predetermined amount, the outdoor thermostat conditions the control circuit so that both the low and high burners are operated and the high speed fan motor windings are energized.

Figure 2:
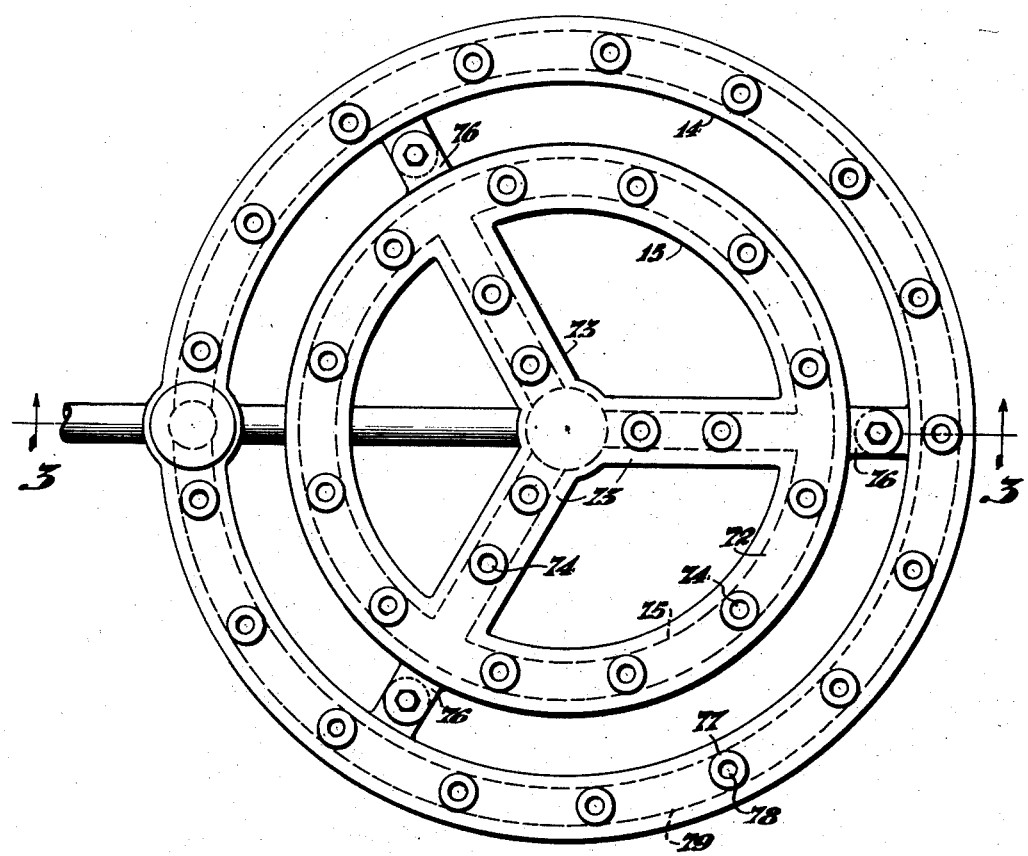
Figure 2 is a top elevational view of the furnace burner unit.
Figure 3:
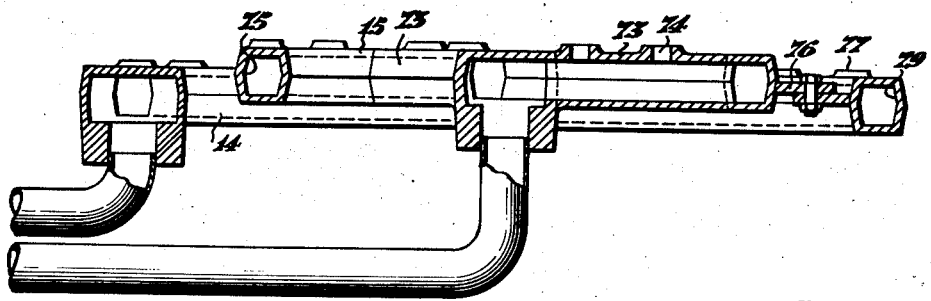
Figure 3 is a cross sectional view taken along line 3—3 of Figure 2.

One preferred form of burner construction is shown in Figures 2 and 3. As there shown, burners 14 and 15 are circular in configuration, the smaller or high burner 15 being disposed interiorly of the low burner 14, concentrically therewith. The high burner comprises an annular tube 72 and three inwardly extending radial arms 73. A plurality of burner pads are formed on annular tube 72 and on each of the arms 73. The pads include central jet openings 74 in communication with the gas conduits formed by walls 75. The inner burner is also provided with three outwardly extending lugs 76, spaced about the periphery of the tube 72 and provided with suitable openings for receiving bolts by means of which the inner burner is secured to burner 14.

The outer burner comprises an annular tubular body including a plurality of pads 77 and jets 78 in communication with the conduit 79 formed by the burner walls. In addition, the low or outer burner includes a plurality of inwardly projecting flanges adapted for cooperation with the outwardly extending lugs of the inner burner. Each of the rings is also provided with a threaded boss formed adjacent its lower edge for connecting the burner to the gas pipe.

In operation, so long as the room temperature is at, or above, the selected level, 72° in the present illustration, the circuits to both gas valves are open at the room thermostat 30; and since the air in the plenum chamber is not heated, the fan motor circuit is open at the fan switch 47. Assuming that it is a mild day, and that the outdoor temperature is above 20°, the outdoor thermostat will also be open and consequently relay coil 62 is not energized. Thus, the armature 55 of coil 62 bridges contacts 54 and 59, and armature 69 is spaced from contacts 67 and 68.

When the temperature of the room drops below 72°, the room thermostat 30 closes, completing the circuit to the low burner valve. This valve opens and gas flows to the low volume burner, however, the high burner valve is not energized because of the open position of relay arm 69. As soon as the air in the plenum chamber is warmed sufficiently to close fan switch 47, the circuit to the low speed fan connection is completed and the blower begins to operate, supplying a moderate volume of warm air to the room.

The air supplied to the room under these conditions is preferably at a temperature of the general order of 130°. However, because of the moderate volume of air supplied at the low fan speed and the moderate temperature gradient between the air and the room temperature, the heated air diffuses throughout the house and establishes an even temperature throughout all areas before the room thermostat reaches its set temperature. When the thermostat reaches this temperature, it opens the circuit to both of the gas valves; however, the fan will continue to operate until the temperature in the plenum chamber drops sufficiently to cause the fan switch to open.

If the weather is severe outside (below 20° in the installation described) the outdoor thermostat is closed, energizing relay coil 62; as a result contacts 54 and 59 will be bridged by armature 55 and contacts 67 and 68 will be similarly connected by armature 69. However, so long as the room temperature is at or above the desired level, both valve circuits will open at the room thermostat and the fan motor energization circuit will be open at fan switch 47 so that no heat is supplied to the room. When the room temperature drops below 72°, room thermostat 30 is closed completing a circuit to both the high and low volume burners which rapidly supply a substantial amount of heat to the air in the plenum chamber, raising the temperature of that air to cause fan switch 47 to close. The closing of fan switch 47 results in the completion of the power circuit to the high speed terminal 60 of the fan motor. As a result, a large volume of warm air is supplied to the heating space and carrying with it a substantial quantity of heat. However, the increased air volume together with the increased combustion rate results in the temperature gradient of the discharged air being only slightly increased from that of the air discharged when only the low burner is in operation.

While in the preferred embodiment the heating system of the present invention comprises a dual gas burner in conjunction with a two-speed fan, it will be appreciated that in some cases, for example where extreme outdoor temperature fluctuations are encountered, it may be desirable to provide three or even more burners in conjunction with a blower operable at a corresponding number of different speeds. That is, for each possible rate of fuel combustion the blower is adapted to provide a different rate of air flow. It will be understood that in such a system the number of outdoor thermostats is increased in correspondence with the number of burners. As in the preferred embodiment, the outdoor thermostats are effective to condition various burners for operation whenever the room thermostat closes, and are similarly effective to condition the fan energization circuit so that both the number of burners operating and the fan speed are correlated with the outdoor temperature.

Having described my invention I claim:

A heating system comprising a furnace having a first burner and a second burner, first and second electrically responsive valves respectively associated with each of said burners for controlling the flow of gas thereto, a blower effective to force air through said furnace and into a room, said blower having a high speed connection and a low speed connection for selectively operating the blower at either a high speed or a low speed, a room thermostat having a single pair of contacts, an outdoor thermostat having a single pair of contacts, the contacts of said room thermostat and the contacts of said outdoor thermostat being adapted to close when the room and outdoor temperatures respectively drop below predetermined levels, the contacts of said indoor thermostat being in series connection with the valve associated with said first burner, an electromagnetic relay including a coil and contacts having a first position and a second position, said relay coil being in series connection with the contacts of said outdoor thermostat, the relay contacts being in a first position when the outdoor thermostat contacts are open and the relay coil is deenergized, the relay contacts being in a second position when the outdoor thermostat contacts are closed and the relay coil is energized, a temperature responsive bonnet switch associated with said furnace, said temperature responsive switch having contacts in series with the high speed and low speed connections of said blower, said relay contacts being in series connection with the high speed and low speed connections of said blower, the relay contacts being effective when in the first position to complete a circuit to the low speed connection of said blower and when in the second position to complete a circuit to the high speed connection of said blower, the relay contacts also being in series with the second electrically responsive valve and being effective to complete a circuit to said valve when the relay contacts are in their second position, whereby when only the room thermostat is closed, the first valve and low speed connection of the blower are energized and when both thermostats are closed, both valves and the high speed connection of the blower are energized.

References Cited in the file of this patent

UNITED STATES PATENTS

| | | |
|---|---|---|
| 1,099,481 | Anderson | June 9, 1914 |
| 1,134,114 | Evans | Apr. 6, 1915 |
| 1,786,901 | Doherty | Dec. 30, 1930 |
| 1,819,560 | Klees | Aug. 18, 1931 |
| 2,168,680 | Nordgren | Aug. 8, 1939 |
| 2,271,120 | Grant | Jan. 27, 1942 |
| 2,300,560 | Faber | Nov. 3, 1942 |
| 2,308,555 | Tate | Jan. 19, 1943 |
| 2,402,177 | Miller | June 18, 1946 |
| 2,502,345 | Ryder | Mar. 28, 1950 |
| 2,516,062 | Logan | July 18, 1950 |
| 2,549,952 | Wheelock | Apr. 24, 1951 |